United States Patent
Heinrich

(10) Patent No.: US 6,353,908 B1
(45) Date of Patent: Mar. 5, 2002

(54) METHOD OF AND CIRCUIT ARRANGEMENT FOR DIGITALLY TRANSFERRING BIT SEQUENCES IN SELECTIVE MANNER

(75) Inventor: Peter Heinrich, Rosenheim (DE)

(73) Assignee: STMicroelectronics GmbH, Grasbrunn (DE)

( * ) Notice: Subject to any disclaimer, the term of this patent is extended or adjusted under 35 U.S.C. 154(b) by 0 days.

(21) Appl. No.: 09/199,395

(22) Filed: Nov. 24, 1998

(30) Foreign Application Priority Data

Nov. 24, 1997 (DE) .......................... 197 52 031

(51) Int. Cl.[7] .............................. G08C 25/02; H04L 1/18
(52) U.S. Cl. ..................... 714/748; 370/224; 714/738
(58) Field of Search .................... 714/738, 748, 714/714; 709/234; 370/473, 503, 224, 498, 228; 379/28; 725/109, 87, 114; 340/825.01

(56) References Cited

U.S. PATENT DOCUMENTS

| | | | | |
|---|---|---|---|---|
| 4,105,995 A | * | 8/1978 | Bothof et al. | 714/714 |
| 4,573,044 A | * | 2/1986 | McConachie et al. | 340/825.05 |
| 4,750,177 A | * | 6/1988 | Hendrie et al. | 714/748 |
| 5,553,083 A | * | 9/1996 | Miller | 714/748 |
| 5,611,047 A | * | 3/1997 | Wakamiya et al. | 709/234 |
| 5,751,719 A | * | 5/1998 | Chen et al. | 370/473 |
| 6,208,666 B1 | * | 3/2001 | Lawrence et al. | 370/503 |

OTHER PUBLICATIONS

Atwood, et al.(Error control in the Xpress transfer protocol; IEEE, Sep. 22, 1993).*
Haghighat, et al. (A fault tolerant di □ributed parallel processing system on LAN workstations; IEEE, Sep. 12, 1997).*
Petras, et al. (Performance evaluation of a logical link control protocol for an ATM air interface; IEEE Oct. 18, 1996).*
Rabinovich, et al. (Efficient support for partial write operations in replicated databases; IEEE, Feb. 18, 1994).*
Hawkins (Concepts of Digital Electronics, 1983, 1ST Ed.); pp. 126–133.*

* cited by examiner

Primary Examiner—Albert Decady
Assistant Examiner—Guy Lamarre
(74) Attorney, Agent, or Firm—Lisa Jorgenson; E. Russell Tarleton; SEED IP Law Group PLLC

(57) ABSTRACT

A method of and a circuit arrangement for data transfer between a master means and slave means, in which bit sequences are transferred each having an address field for addressing the respective slave means to be controlled, a control field for control information, and a data field. The data bit number of the data field may be different depending on the addressed slave means. The bit sequences transmitted from the master means are read back directly to the master means, so that the occurrence of corrupt bits in the bit sequence is recognized and a transfer of the bit sequence recognized as corrupt to the addressed slave means can be prevented.

47 Claims, 7 Drawing Sheets

METHOD OF AND CIRCUIT ARRANGEMENT FOR DIGITALLY TRANSFERRING BIT SEQUENCES IN SELECTIVE MANNER

TECHNICAL FIELD

The invention relates to a method of, and a circuit arrangement for, digitally transferring bit sequences in selective manner between a higher-order circuit part and a lower-order circuit part. Taking over English language usage, one often speaks of master and slave in conjunction with higher-order and lower-order circuit parts. The term host also is commonly employed for the higher-order circuit part. In practical embodiments, the master circuit part may be a microcontroller and the slave circuit part may be a function block having function means such as control means and measuring means.

BACKGROUND OF THE INVENTION

The master circuit part and the slave circuit part usually cooperate via a bus system by means of which digital signals can be transferred between the master circuit part and the slave circuit part. The signal transfer via the bus system is subject to a defined protocol, which is frequently referred to as bus protocol.

A known bus system is the so-called SPI (Serial Peripheral Interface) with the associated SPI bus protocol. This is shown, for example, in the data sheet of the company Aureal Semiconductor, relating to circuit VSP 901, pages 12 and 13, dating from February 1997.

The signal representation shown in FIG. 7 of said publication is depicted herein in attached FIG. 13. In this figure:

SCK is the serial clock
HREQ is the host request signal
SS is the slave select signal
MOSI is the Master Out Slave In (transfer from master to slave)
MISO is the Master In Slave Out (transfer from slave, to master)
SPICMD is an additional signal that extends the SPI protocol to indicate whether the master has placed a register address or register data on the SPI bus.

Some operating features of the SPI bus protocol will now be discussed briefly by way of FIG. 13.

Signal HREQ has a logic value L (LOW) when the master is ready to receive a 24-bit data word. The slave is connected to the master via a slave select line SS. Via these slave select lines, the host informs the slave when it intends to send the particular data information to the slave. The respective data word is transferred via the MOSI lines from the host or master to the slave, and a data word transmitted before is transferred back to the master or host via the MISO line. Upon occurrence of the first clock pulse of the next data word to be transferred, HREQ is set to logic value H (HIGH) by the master. The master scans SPICMD and sets HREQ to H when it is ready to receive the next data word. If SPICMD is L, this indicates the transfer of a register address. If SPICMD is H, this indicates the transfer of a register value. The host deactivates the SS line after it has written the last bit to the master. In case the host deactivates the SS line of the receiving master before the end of the data word transfer since the host has to settle first a task of higher priority, the data word transfer is aborted and the master discards the received data.

FIG. 12 shows in a block circuit diagram a circuit arrangement suitable for the SPI protocol, comprising a master circuit part e.g., in the form of a microcontroller $\mu C$, a serial interface SI and a slave circuit part in the form of a multi-function block MFB accommodating e.g., six functions F1 to F6. The functions F1 to F6 in total require, for example, a data field having a data field width or data bit number of 30. A data bus DB connecting the serial interface SI and the multi-function block MFB thus has a corresponding data field width of 30 bits. The microcontroller $\mu C$ and the serial interface SI are connected to each other via three terminals: a serial input Sin, via which serial bit sequences can be transferred from microcontroller $\mu C$ to serial interface SI, a serial output Sout, via which serial bit sequences can be transferred from serial interface SI to microcontroller $\mu C$, and a clock terminal CLK, via which a system clock can be supplied to serial interface SI.

In a data transfer, the data for all functions F1 to F6 must be transferred each time. Thus, a data transfer with a data width of 30 bits is necessary each time. When a function needs to be reprogrammed, writing over of all functions FB1 to FB6 is necessary. This involves the risk that functions whose programming actually is to remain unchanged are erroneously programmed in a different manner.

The SPI protocol involves some problems.

1. When during transfer from master to slave a data value is corrupted, the corrupted or falsified data value is written to the target register of the slave, without the master being informed of whether a correct or an incorrect data transfer has taken place.
2. When a data value is corrupted within a slave, the master is not notified thereof. To overcome this problem, an examination (which is not provided for in the SPI protocol) of the entire reading back operation and a new write operation would have to be carried out. This would consume operating time of the master and delay the entire data transfer.
3. The SPI protocol uses a fixed data word length. Each bit within this fixed data word length has a specific function. When one of the master or slave is altered with respect to one or parts of its functions, all functions have to be programmed anew, also the functions that are not to be altered. This means that also the functions not requiring new programming have to be written over. This increases the risk of erroneous programming changes.
4. In case one or several functions are to be added later on, this necessitates as a rule a hardware change. The interface between master and slave is designed for the fixedly determined data word length, which in the example shown in FIG. 12 is a data word length of 30 bits. If, by adding additional functions, an increase in the data word length becomes necessary, both the interface and the process control will have to be changed.

The present invention has the object of overcoming such problems. In particular, more flexibility with respect to functional changes and extensions of functions as well as increased safety as regards a correct data transfer are to be achieved.

SUMMARY OF THE INVENTION

The invention to this end makes available a method and a circuit arrangement, which can be developed in advantageous manner in accordance with the description herein. In addition thereto, a test bit generator is provided, which is of significance both for the method and for the circuit arrangement.

The method provides a bus protocol for digitally transferring bit sequences in selective manner between a master means and several selectively controllable slave means via an interface means provided therebetween, making use of bit sequences of predetermined maximum frame length, comprising an address field addressing the respective slave means to be controlled, a control field containing control information, and a data field. While the address field and the control field each have a predetermined field length or bit number, the data field for the slave means may have different field lengths or data bit numbers as long as the data field does not exceed a (freely selectable) maximum data bit number. The bit sequences transferred in serial form are written in succession to successive register stages of an interface register and read back to the master means. Reading back is carried out register stage for register stage immediately after having been written to the respective register stage where writing to a register stage and reading back from this register stage take place during the same clock pulse. The master means compares the bit read-back from the respective register stage with the bit transmitted for this register stage. When the read-back memory contents of any of the register stages are not in conformity with the bit transmitted from the master means for this register stage, the master means blocks the transfer of the respective transmitted bit sequence to the respective addressed slave means.

This method ensures that a bit read incorrectly to the interface register is immediately recognized as incorrect, and that clock errors, for example the omission of one or more clock pulses, are recognized. In case of a corrupt bit sequence, this sequence is not transferred first to the addressed slave means as the corruption becomes evident only during examination after transmission of the entire bit sequence, but rather the transfer to the addressed slave means is not released at all when the bitwise examination, reveals an error in the respective bit location read to the interface register.

According to the invention, each of the individual functions has a slave means of its own associated therewith. The individual slave means can be addressed separately and can make use of various data field lengths.

The data field length associated with a specific slave means can be accommodated in the address code for this slave means. The respective address then indicates to the master means how big the data field length of the addressed slave means is and when a bit sequence end signal can be set. When new slave means are added, the data field length thereof is encoded in the address thereof. It is thus possible without a problem to add new slave means with arbitrary data field lengths as long as these data field lengths are below the maximum data field length established for the entire system. When particularly high flexibility is to be retained, the maximum data field length can be set to a high value so that further slave means requiring high data field lengths can still be added later on. This does not necessitate a hardware change as regards the master means, the interfaces or the process control.

Particularly simple is coding of the data field length within the addresses when the individual addresses have assigned thereto spaces or locations within a predetermined address sequence in an address register, with a specific data field length being associated to the location of a specific address within the address sequence.

In a preferred embodiment of the invention, the control field of the bit length to be transferred has the length of one bit only. The control bit of a bit sequence transmitted from the master means provides information as to whether a write or a read operation is to be carried out. When an error is detected during an operation in which data bits are to be transferred from the master means to a slave means, said detection being made with the aid of a direct reading back of the bits written to the individual register stages of the interface register, the control bit of the bit sequence transmitted from the master means is used for blocking reading of the bit sequence written to the interface register into the addressed slave means.

In the bit sequences transferred from the slave means to the master means, the control bit can be used for delivering status information to the master means. This may provide information as to whether the data contents of the respective addressed slave means have changed since the last write and/or read operation for this slave means, be it due to a data corruption or new existing data, for example since the slave means is a sensor or measuring means.

In another embodiment of the invention, the control bit (optionally all control bits) in a bit sequence transmitted from the master means is separated therefrom, and only the address field and the data field are passed on to the slave means. The control information obtained from the control bit is sent via separate signal lines to the slave means. In case of a transfer of a bit sequence from a slave means to the master means, a control bit (or several control bits), for example in the form of the status bit mentioned, is introduced into this bit sequence before the bit sequence reaches the master means.

For generating a status bit for the master means, an embodiment of the invention provides for a test bit generation in which a test bit is generated from a bit sequence transferred between the master means and a slave means, and is stored. During the next transfer of a bit sequence between the master means and the same slave means, another test bit is generated and compared with the previously stored test bit. From this comparison, a status bit is generated by means of which the master means is notified whether or not the data contents of the slave means concerned have changed since the previous transfer of a bit sequence between the two.

Test bit storing advantageously takes place in a test bit register within the respective slave means.

A circuit arrangement according to the invention comprises an interface register and a conversion means disposed between the master means and the interface register. This conversion means may comprise a process control means and a multiplexer. Control signals obtained by means of the process control means can be used on the one hand for taking out the control bits of the respective bit sequence or inserting them thereinto, and on the other hand can be used to control the bitwise writing of the serial bit sequence obtained from the master means to the individual register stages of the interface register as well as to control reading back of the memory contents of the individual register stages of the interface register in the master means. Between conversion means, interface register and slave means, there may be connected a switching unit which, in accordance with the write/read information obtained from the master means, passes the bit sequence written to the interface register both back to the master means and to the slave means, or passes the bit sequence read from an addressed slave means to the master means.

Test bit generation preferably makes use of a series connection of a plurality of XOR elements. The first XOR element of this series connection is fed with the first and second bits of the bit sequence to be tested. The additional XOR elements are fed with a further bit of the bit sequence and an output signal of the respective preceding XOR element. The test bit is available at the output of the last XOR element.

In a further development of this test bit generator, the last XOR element of this series connection is followed by an additional XOR element which on the one hand is fed with the respective actual or current test bit and on the other hand with the stored, preceding test bit and at the output of which an information signal is available which provides information as to whether the respective bit sequence examined has changed between the times of preceding test bit generation and current test bit generation. The output signal of the additional XOR element can thus be used as a status signal which may be introduced as a control bit into a bit sequence to be transferred to the master means.

This type of test bit generator is significant both in connection with the inventive protocol in the form of the method according to the invention and the circuit arrangement according to the invention as well as independently thereof. Such a test bit generator, independently of the protocol according to the invention, may be used wherever a test bit is to be produced for bit sequences, possibly together with an additional generation of a change information signal.

The invention as well as additional objects, aspects and advantages of the invention and of embodiments thereof will now be discussed by way of examples with reference to the drawings in which:

DETAILED DESCRIPTION OF THE INVENTION

Figure 12:
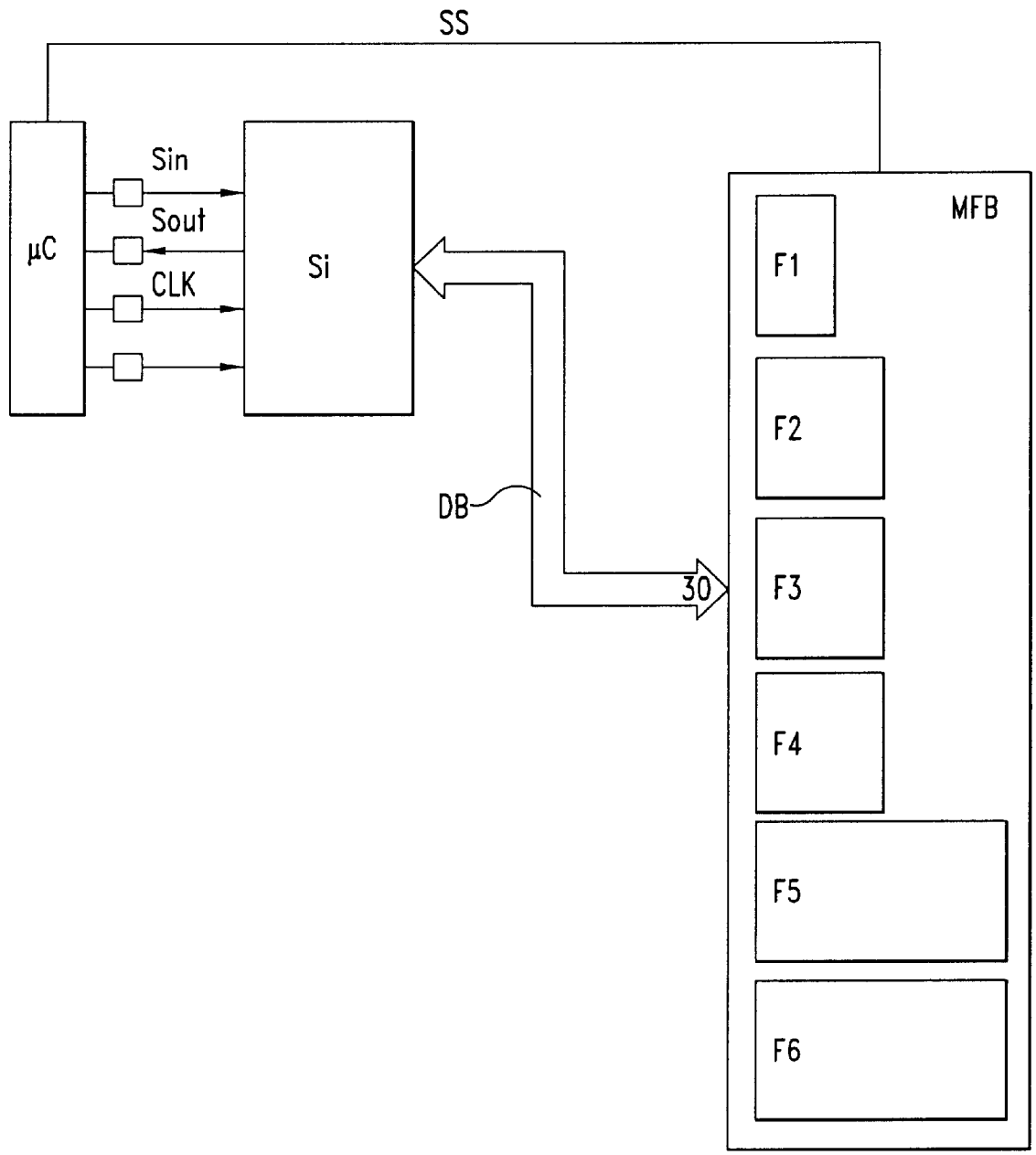
FIG. 12 shows a serial interface and a single multifunction block in a design according to the SPI protocol.

FIG. 12 shows a circuit arrangement suitable for the conventional SPI protocol, comprising a microcontroller μC, a serial interface SI and a multi-function block MFB, the serial interface SI and the multi-function block MFB being connected to each other via a data bus DB having a data field length of 30 bits. Multi-function block MFB serves to control various functions FB1 to FB6.

Figure 13:
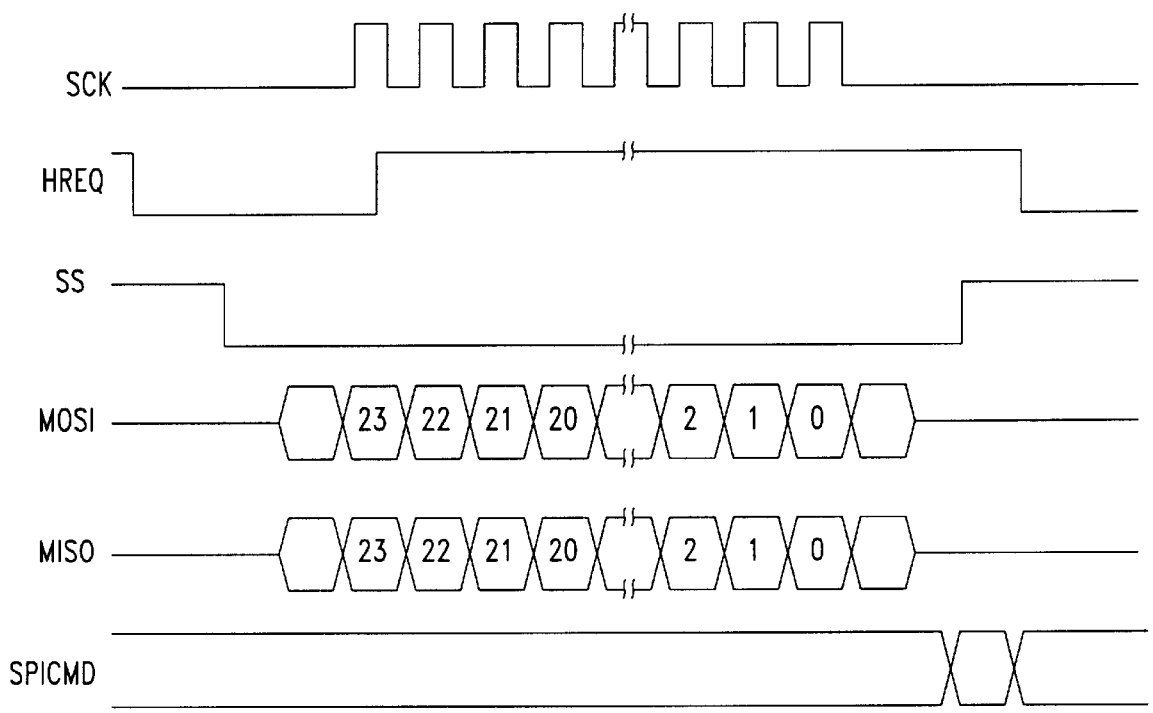
FIG. 13 shows a representation of the known SPI protocol.

The bit sequences shown in FIG. 13 (having a different bit number) are transferred via data bus DB, from serial interface SI to multi-function block MFB or vice versa. Serial interface SI receives, via a serial input Sin, a serial bit location, for example, from a microcontroller and, via a serial output Sout, transmits bit sequences to the microcontroller. Multi-function block MFB, furthermore, is connected to a select line SL via which the slave select signal SS of FIG. 13 is supplied when the multi-function block MFB shown is selected for data exchange with the serial interface SI and thus with the microcontroller.

All control and functional data contained in the individual bit locations of the bit sequence are transferred by way of the data bit sequence according to FIG. 13 to multi-function block MFB during each write operation. In case of reprogramming, for example, of only one of the partial functions of the multi-function block, reprogramming of the entire data field has to be carried out, i.e., also as regards functions that are not to be changed. This involves the risk that during such reprogramming programming errors occur as regards functions that are not to be changed.

Since, according to the SPI protocol, data bit sequences or data words are read back to the master means, which in the example considered is the microcontroller, only at that time at which the microcontroller transmits a new data word, such reading back cannot be used for determining whether one or several data bits were corrupt in the preceding data word transfer. The corruption of data bits during the transfer thus cannot be ascertained. The stopping of a data word transfer, as provided for according to the SPI protocol, takes place when a higher priority is assigned to a different operation than the presently running data transfer and when the current data transfer therefore is stopped. There is no stopping or prevention of a data word transfer because of the determination of corrupt data.

Figure 11:
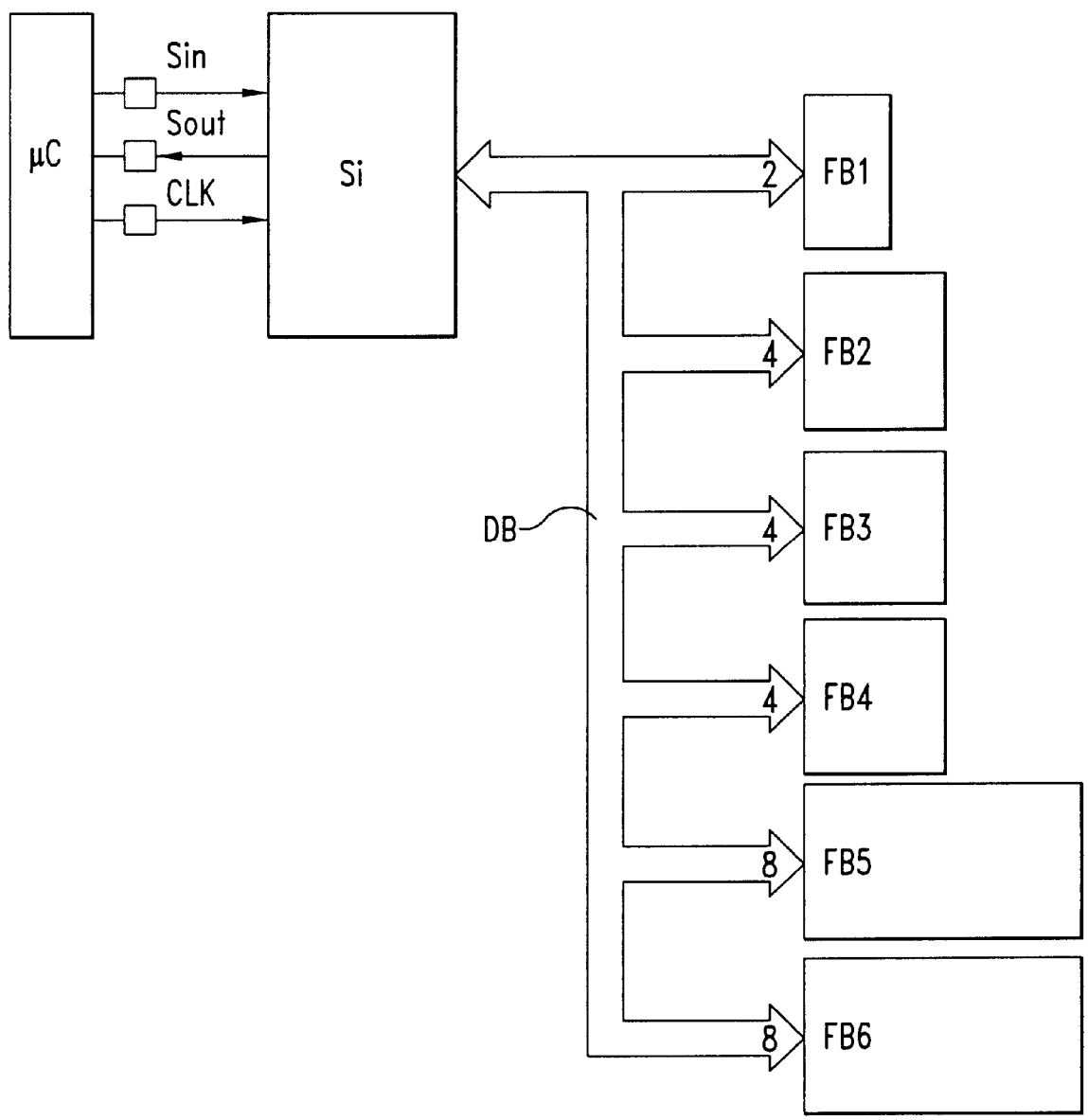
FIG. 11 shows a block diagram of a serial interface and several functional blocks in a design according to the invention.

The invention takes a different path. As shown in FIG. 11, the concept according to the invention, instead of the single multi-function block MTB of FIG. 12, makes use of a number of individual, separate function blocks FB1 to FB6 which are all connected to serial interface SI via data bus DB. The arrow heads of data bus DB directed towards function blocks FB1 to FB6 show numbers indicating the data field length required by the respective function block for performing its function. Thus, it can be seen that a bit sequence sent from the master means of a function block needs a data field length of 2 data bits when function block FB1 is addressed, needs a data field length of 4 data bits when one of function blocks FB2 to FB4 is addressed, and needs a data field length of 8 data bits when function block FB5 or FB6 is addressed.

When the master means transmits a bit sequence, the address field thereof and the data field thereof are supplied to all function blocks FB1 to FB6. The addressed function block recognizes that it is the block meant and takes over the data field of the transmitted bit sequence in a data field register. By means of the address, the master means knows how big the data field length of the respective addressed function block is. By means of the frame beginning and frame end signals delivered by the master means at the beginning and end of a transmitted serial bit sequence, the frame end signal is set in variable manner in accordance with the respective addressed function block, namely when the data bit number has been transmitted which corresponds to the data field length of the addressed function block.

In FIGS. 11 and 12, interface terminals are shown between the microcontroller and the serial interface SI, Sin being a terminal for an incoming serial bit sequence, Sout being a terminal for an outgoing serial bit sequence and CLK being a terminal for a clock.

Figure 1:
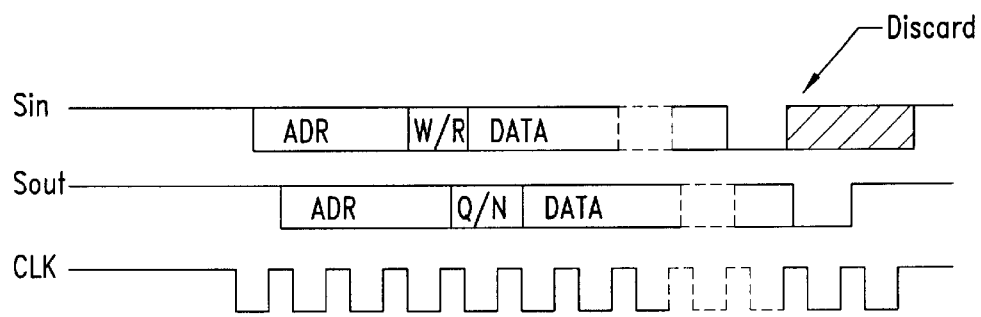
FIG. 1 shows a process diagram of a protocol according to the invention.

An example of a protocol for performing the method according to the invention is shown in FIG. 1. The three signals shown each bear the designation of that interface terminal to which they are supplied and from which they are derived, respectively.

When the master means, which for reasons of simplicity will be referred to as microcontroller in the following, delivers a serial bit sequence, the latter is read (to the left in FIG. 1) successively bit for bit in an interface register of serial interface SI under the control of clock CLK. In the representation of FIG. 1, it is assumed that bitwise reading-in takes place at each ascending edge of the respective associated clock pulse. Immediately after writing a bit, namely still during the clock pulse of the same, reading back of the memory contents which are associated with this bit and have just been written to the interface register during this clock, in the microcontroller is carried out. The latter performs an assessment, by way of the bit location of the respective bit written to the interface register, as to whether the bit read-back for this bit location is identical with the bit delivered to serial interface SI. If this is so, it may be assumed that the respective bit assessed has been transferred correctly to the interface register and written therein. When there is no conformity between the bit transmitted for the bit location concerned and the bit read back for this bit location, it is assumed that the particular bit is corrupt, namely that it has either arrived incorrectly at the interface register or has been stored incorrectly in the interface register.

When all bits of the respective bit sequence have been read into the interface register, the frame end signal is delivered from the microcontroller. Subsequent to the frame end signal, a so-called discard bit is provided. The latter has a logic value L, for example, when the read-back bit sequence is in conformity with the bit sequence sent to the interface register. In contrast thereto, the discard bit has a logic value H when is has been determined by reading back that at least one corrupt bit is present.

As shown in FIG. 1, the serial bit sequence contains firstly an address field having a predetermined number, for example three, address bits, followed by a control field having preferably only one control bit, and following the latter a data field having a data bit number depending on the addressed function block (of the addressed slave unit). The frame beginning of a bit sequence is signaled by the descending edge of the first address bit, whereas the frame end of the respective bit sequence is indicated by the descending edge of the last data bit. After the last data bit, a transition from "0" to "1" or from L to H is set as frame end signal. When no corresponding transition is read back in the microcontroller after the last data bit, the microcontroller assumes that an incorrect bit sequence transfer to the interface register has taken place.

In the control field of the bit sequence delivered to the serial interface, there is provided a write/read control signal W/R by means of which the respective addressed function block is notified whether it is to be set to the write mode for having it take over new data, or whether it is to be set to the read mode to be able to transfer its data contents to the microcontroller.

The write/read control signal W/R is taken out of the bit sequence transmitted by the microcontroller before it is written to the interface register. The corresponding control bit, however, is delivered to the functional blocks during the time slot of the discard bit only. If the control bit is a write command, this command is delivered to the function blocks only when it has been determined by the read-back operation in the microcontroller that a correct data transfer to the serial interface has taken place. If, in contrast thereto, at least one corrupt bit has been ascertained during reading back, outputting of a write control signal during the time slot of the discard bit is suppressed so that writing of a corrupt bit sequence in the respective addressed function block is prevented. The proceedings are the same when no transition from L to H has been ascertained after the end of the last data bit, since it is to be assumed in this case that an incorrect bit sequence transfer has taken place, for example due to erroneous clock pulses at the location of the interface register or due to erroneous use of the clock pulses that had arrived correctly at the interface register.

Due to the fact that the microcontroller always determines whether the respective bit sequence is to be written into a function block or read from a function block, the bit sequence sent to the microcontroller and based on reading out of a function block need not contain a control bit containing a control command as regards reading or writing. Such bit sequences serving for transfer from a function block to the microcontroller, on their course to the microcontroller, are provided in their control bit field with a control bit of different nature. This is preferably a status bit indicating to the microcontroller whether the data contents of a function block have changed since the last write or read access to this function block, be it due to interferences or be it due to the taking over of new data in the function block, for example when the latter is a measuring or sensor function block. The microcontroller may then respond to the status signal in corresponding manner.

FIG. 1 shows the two frames for serial bit sequence written to the interface register (Sin) and the frame of the bit sequence read-back to the microcontroller (Sout), in somewhat offset manner in terms of time. The reason hereof is that the individual register stages constituting the interface register and being preferably a flip-flop each, have a certain, delay time between the moment when the process of writing of a bit commences and the moment when this bit is stored and can be read out again from this register stage.

The protocol according to the invention permits high flexibility. As there are different data field lengths possible for the separate function blocks, the fame length of the respective bit sequences transferred also can be variable in corresponding manner so that, for example, when bit sequences are often transferred to function blocks of short data field length, an in total shorter average frame transfer time can be achieved. Due to the variable data field length, it is also possible to add new functional blocks, without the necessity of making hardware changes, as long as only the data field length of the new function block added does not exceed a maximum data field length chosen for the entire system. New programming of an arbitrary function block can be carried out for this block alone, without the necessity of performing new programming for all other function blocks as well.

The master means, for example the microcontroller, is at all times informed about the quality of the data transfer and whether or not the data contents in the function blocks have changed.

In certain applications it may be advantageous to reset the data contents of at least part of the function blocks after a data transfer operation to a predetermined initial state. This can take place by transferring a rest control command during the time slot of the discard bit.

A preferred embodiment of a circuit arrangement according to the invention, for performing a method according to the invention, will now be considered by way of FIGS. 2 to 11.

Figure 2:
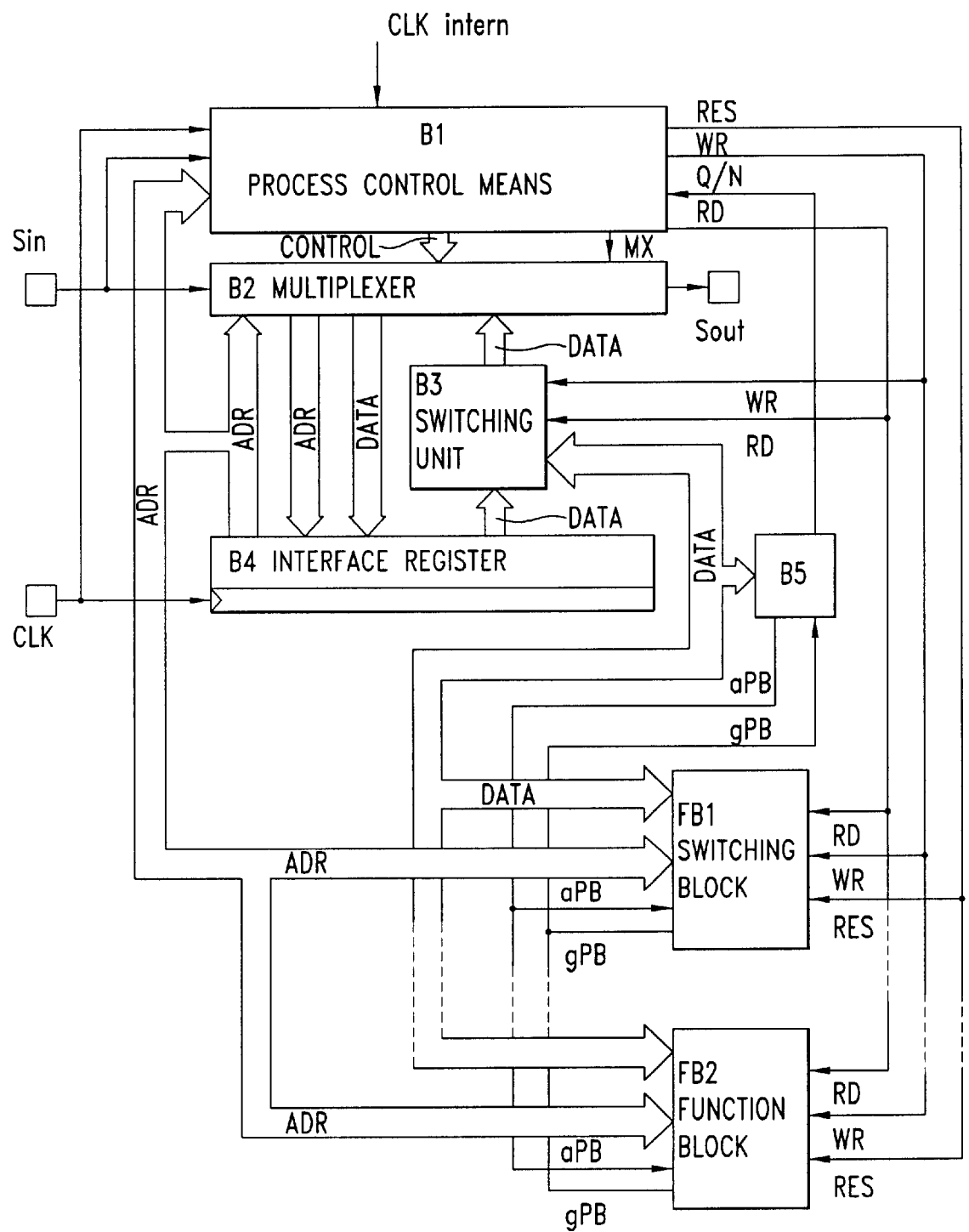
FIG. 2 shows a block diagram of an embodiment of a circuit arrangement according to the invention.

FIG. 2 shows in a block diagram an overall representation of a circuit arrangement according to the invention, comprising a process control means B1, a multiplexer B2, a switching unit B3, an interface register B4, a test bit generator B5 and two function blocks FB1 and FB2. The process control means B1, the multiplexer B2, the interface register B4 and the function blocks FB1 and FB2 are each connected to an address bus ADR. As indicated by the arrows of this address bus, a bi-directional bus system is involved here. As regards the address bus connection between multiplexer B2 and interface register B4, there are provided two mutually separate address busses.

The process control means B1 and the multiplexer B2 are connected to each other via a control bus CONTROL, in the flow direction from process control means B1 towards multiplexer B2.

In addition thereto, there are provided several data busses DATA. A data connection exists from multiplexer B2 to interface register B4 directly and from interface register B4 to multiplexer B2 via switching unit B3. The switching unit furthermore is connected to a bi-directional data bus DATA connecting the switching unit B3 to the test bit generator B5 and to function blocks FB1 and FB2.

In addition to the bus lines marked by double-line arrows in the figures, there are provided signal lines indicated by single-line arrows.

Signal lines for transferring the serial bit sequence delivered from the microcontroller (not shown in FIG. 2) extend from the serial input terminal Sin of serial interface SI to the process control means B1 and to multiplexer B2. An output line leads from multiplexer B2 to serial output Sout, for transferring a serial bit sequence to the microcontroller. The system clock CLK is applied to process control means B1 and interface register B4. A write control line WR, a read control line RD and a resetting control line RES lead from process control means B1 to function blocks FB1 and FB2. Branches extend from write control line WR and read control line RD to switching unit B3. A line for transferring the respective current test bit aPB leads from test bit generator B5 to function blocks FB1 and FB2, while a line for transferring a previously stored test bit gPB leads from function blocks FB1 and FB2 to test bit generator B5. A status control line Q/N is passed from test bit generator B5 to process control means B1. In addition thereto, an internal clock CLKintern is fed to process control means B1.

The individual blocks of the circuit arrangement shown in FIG. 2 are indicated in FIGS. 3 to 10 and will now be elucidated one after the other as regards the structure and mode of operation thereof.

Figure 3:
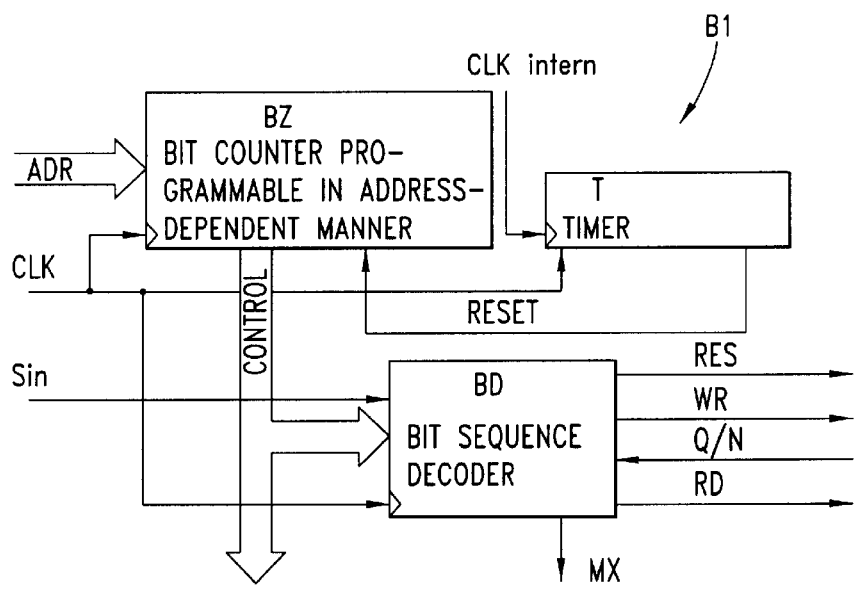
FIG. 3 shows a process control means of the circuit arrangement depicted in FIG. 1.

An embodiment of a process control means B1 is shown in FIG. 3. It comprises a bit counter BZ programmable in address-dependent manner, a bit sequence decoder BD and a timer T. Bit counter BZ is connected to control data bus CONTROL delivering control data produced by bit counter BZ to bit sequence decoder BD. Moreover, bit counter BZ is connected to address bus ADR. The system clock CLK is supplied to bit counter BZ, timer T and bit sequence decoder BD. Bit sequence decoder BD, furthermore, is connected to terminal Sin for the bit sequences delivered from the microcontroller. Bit sequence decoder BD, in addition thereto, is connected to the outgoing control lines RES, WR and RD and to the incoming control line Q/N. Moreover, bit sequence decoder BD has an output line MX. An internal clock is supplied via line CLKintern to timer T. An output line RESET of the timer is connected to a resetting input of bit counter BZ.

Bit counter BZ is programmed in address-dependent manner under the control of the address of the respective addressed function block FB1 or FB2 (with the possibility of providing more function blocks in practical embodiments). Due to such programming, bit counter BZ is notified of the overall bit number of the bit sequence to be sent to the addressed function block. Bit counter BZ thus "knows" to which clock pulses counted by it the address field, the control field and the data field belong and at which clock time slot the discard bit is due. On the basis of this "knowledge", bit counter BZ produces control data for bit sequence decoder BD. Due to this control information, bit sequence decoder BD ascertains at which bit location of the bit sequence received via Sin the control bit occurs, which, depending on the meaning contents of the control bit, results either in a write control signal WR or a read control signal RD being issued during the time slot of the discard bit. On the basis of the "knowledge" when the control bit is due, the bit sequence detector BD, during the time slot of the control bit of a bit sequence to be passed from a function block to the microcontroller, can introduce a control bit in the form of the status signal Q/N, which is effected with the aid of a control signal at the output MX of bit sequence decoder BD.

Timer T is used for monitoring whether system clock pulses are received via terminal CLK. To this end, timer T is fed with the internal clock pulses via line CLKintern. If a system clock supplied via CLK is not received for a specific period of time of e.g., 1 ms, timer T issues a reset signal to bit counter BZ via resetting line RESET in order to reset bit counter BZ to its initial state. With the aid of timer T it is thus possible to determine when clock errors are present or when the entire system is set to a rest condition by adjustment of the system clock pulses.

Figure 4:
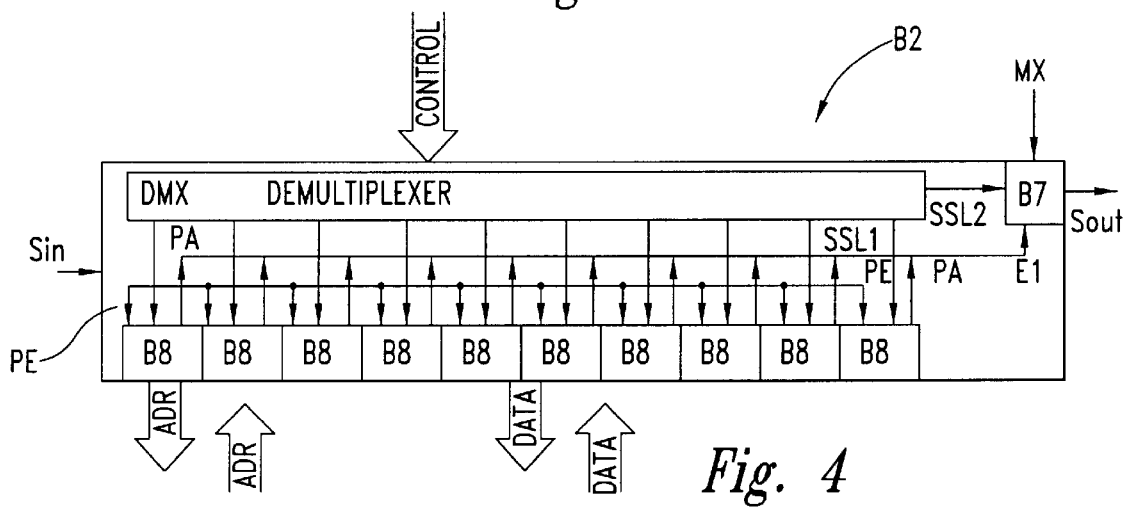
FIG. 4 shows a multiplexer of the circuit arrangement depicted in FIG. 1.

Multiplexer B2 shown in FIG. 4 comprises a demultiplexer DMX, a switching means B7 and a series of switch stages B8. Embodiments of a switch stage B8 and a switching means B7 are shown in FIGS. 5 and 6, respectively.

Figure 5:
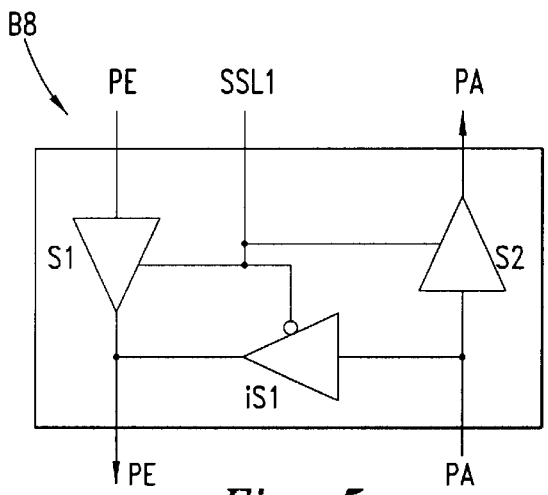
FIG. 5 shows a switch stage of the multiplexer depicted in FIG. 4.
Figure 6:
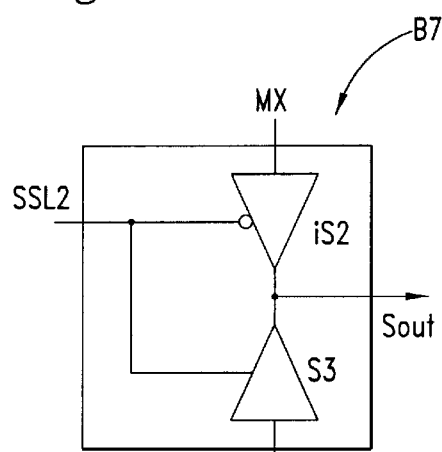
FIG. 6 shows a switching means of the multiplexer depicted in FIG. 4.

The triangles shown in FIGS. 5 and 6 are symbols indicating electronic switches. The two lines leading to the tip and to a triangle side opposite the tip are the signal lines to be connected to each other or separated from each other by means of the electronic switch, whereas the line leading to another triangle side each is a switching control line.

The switch means shown in FIG. 5 comprises a first switch S1, a second switch S2 and a first inverse switch IS1. Switches S1 and S2 are switched to the conducting state when a switching control line SSL1 is fed with a logic value H or "1". Inverse switch IS1 is brought to the conducting state when a logic value L or "0" is fed via control line SSL1.

The same holds in corresponding manner for a second inverse switch IS2 and a third switch S3 of switching means B7 shown in FIG. 6. It holds again here that third switch S3 is brought to the conducting state and the second inverse switch IS2 to a non-conducting state when a logic value H or "1" is supplied via a control line SSL2, whereas S3 is blocking and IS2 is conducting when a logic value 1 or "0" is supplied via SSL2.

Multiplexer B2 is fed via a serial input Sin with the bit sequence sent from the microcontroller, and multiplexer B2 issues, via a serial output Sout, a bit sequence to be fed to the microcontroller.

The switch stage series of multiplexer B2 comprises a number of switch stages B8 equal to the sum of the address bit number and the maximum data bit number. Each switch stage B8 has a parallel input PE extending via first switch S1 and a parallel output PA extending via second switch S2. The parallel inputs PE of switch stages B8 are connected to serial input Sin. The parallel outputs PA of switch stages B8 are connected to a connecting line VL leading to a first input E1 of switching means B7. Control lines SSL1 are connected to a respectively associated control output of demultiplexer DMX each. Switching control line SSL2 is connected to another control output of demultiplexer DMX.

Switching means B7 is connected via a second input to output line MX of bit sequence decoder BD.

Figure 7:
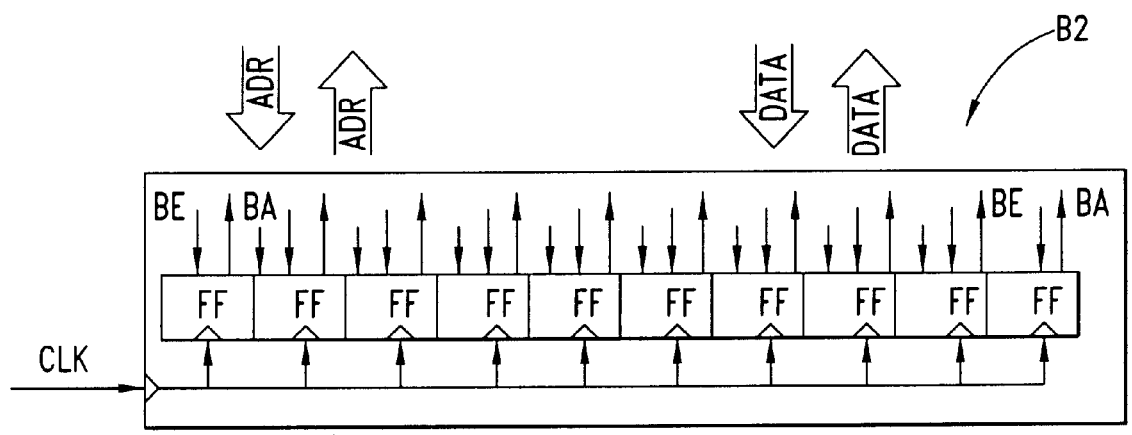
FIG. 7 shows an interface register of the circuit arrangement depicted in FIG. 1.

An embodiment of an interface register B4 is shown in FIG. 7. It comprises a series of register stages FF the number of which corresponds to the number of switch stages B8, i.e., to the sum of address bit number and data bit number. Interface register B4 has the system clock CLK applied thereto in such a manner that all register stages FF are clocked at the same time. The individual register stages FF are each writeable and readable in parallel. To this end, each register stage FF comprises a bit input BE and a bit output BA connected to the parallel input PE and the parallel output PA, respectively, of the respectively associated switch stage B8. The connection between multiplexer B2 and interface register B4 by means of parallel inputs PA and parallel outputs PE and, respectively, by means of bit inputs BE and bit outputs BA is established by the address and data bus lines ADR and DATA, respectively, extending between multiplexer B2 and interface register B4.

Demultiplexer B2 and interface register B4 cooperate as follows:

When a serial bit sequence from the microcontroller is received via serial input Sin of multiplexer B2, the individual bits of this bit sequence, under the control of demultiplexer DMX and in accordance with the control data delivered via data bus CONTROL, are written to the individual register stages FF of interface register B4 in clockwise manner one after the other via one of the switch stages B8 each. During the same clock time slot in which writing in a specific register stage takes place, the memory contents of this register stage created by such writing is read out via the same associated switch stage B8 and is fed via connecting line VL and switching means B7 to serial output Sout of the multiplexer. To this end, switches S1 and S2 of the switch stage B8 concerned are each brought to the conducting state, and the inverse switch IS1 thereof is brought to the non-conducting stage, whereas switch S3 of switching means B7 is brought to the conducting state and inverse switch IS2 thereof is brought to the non-conducting state.

In all other switch stages B8, switches S1 and S2 are non-conducting and inverse switch IS1 is conducting, so that the register stages FF of interface register B4 cooperating therewith newly write their memory contents with the system clock in cyclical manner via inverse switch IS1.

Figure 8:
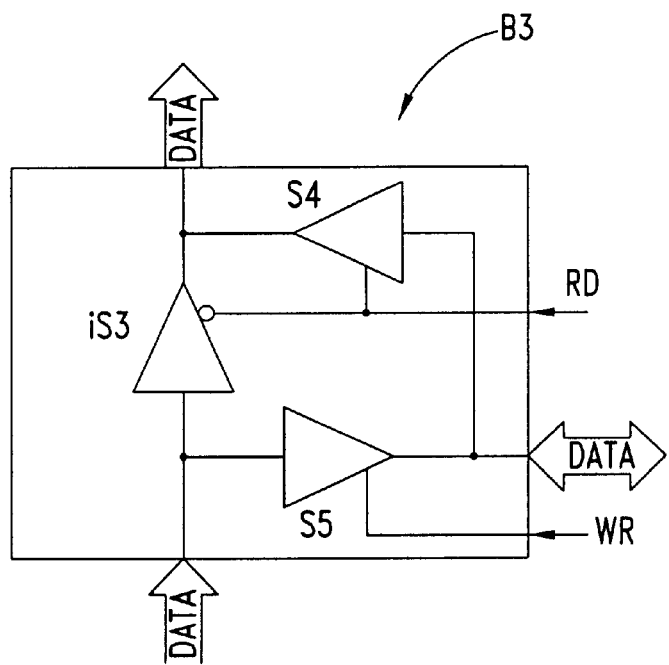
FIG. 8 shows a switching unit represented by symbols for electronic switches.

FIG. 8 shows an embodiment of switching unit B3, using switch symbols for electronic switches as shown already in FIGS. 5 and 6. Switching unit B3 comprises a fourth switch S4 and a fifth switch S5 as well as a third inverse switch IS3. Via IS3, a connection can be established between the data bus coming from interface register B4 and the data bus leading to the multiplexer. Via S5, a connection can be established between the data bus coming from interface register B4 and the data bus establishing a connection to test bit generator B5 and function blocks FB1 and FB2. By means of S4, a connection can be established between the data bus connecting with B5, FB1 and FB2 and the data bus leading to B2.

When a write control command is present, switches S5 and IS3 are conducting, and switch S4 is non-conducting. Data coming from interface register B4 thus are fed on the one hand to multiplexer B2 and on the other hand to test bit generator B5 and function blocks FB1 and FB2. When a read control command is present, S5 and IS3 are non-conducting and S4 is conducting. In this switching state, switching unit B3 passes data to multiplexer B2 on the data bus establishing a connection to B5, FB1 and FB2.

Figure 9:
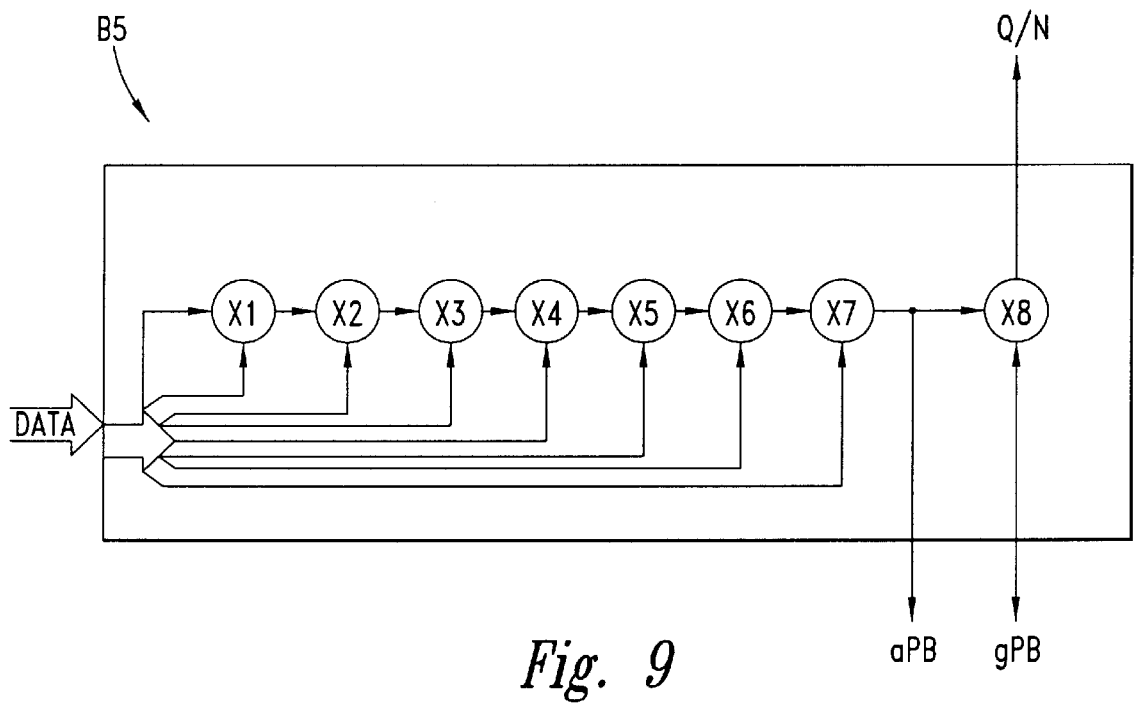
FIG. 9 shows a test bit generator of the circuit arrangement depicted in FIG. 1.

An embodiment of a test bit generator B5 as shown in FIG. 9 comprises a series connection including XOR elements X1 to X8, each having two XOR inputs and one XOR output. While the two XOR inputs of the first XOR element X1 are fed with one of the data bits of the data bus each, the two XOR inputs of XOR elements X2 to X7 each receive an additional bit of the data bus and an output signal from the XOR output of the respective preceding XOR element. The XOR output of X7 delivers a test bit that is sent to each of the two function blocks FB1 to FB2 and, furthermore, is fed to a XOR input of the additional XOR element X8, which via its second XOR input is fed with a test bit from function block FB1 or FB2. A change indication or status signal Q/N is available at the XOR output of X8.

A XOR element with two inputs, as is generally known, issues at its output a logic value "0" when both inputs have the same logic value applied thereto, and a logic value "1" when different logic values are associated with the two inputs. A specific data bit pattern on the data bus DATA thus results in one specific test bit at the output of XOR element X7. This test bit is the respective actual or current test bit aPB which is sent to a test bit memory of the respective addressed one of the two function blocks FB1 and FB2. By means of the additional XOR element X8, the respective current test bit is compared with test bit gPB which has been stored previously in the respective addressed one of the function blocks FB1 and FB2. Depending on whether or not the current test bit is identical with the previously stored test bit, a logic value "0" or "1" appears as status signal at the output of X8. The microcontroller can recognize therefrom whether or not the data contents of the addressed one of the two functional blocks FB1 and FB2 have changed in the meantime.

Figure 10:
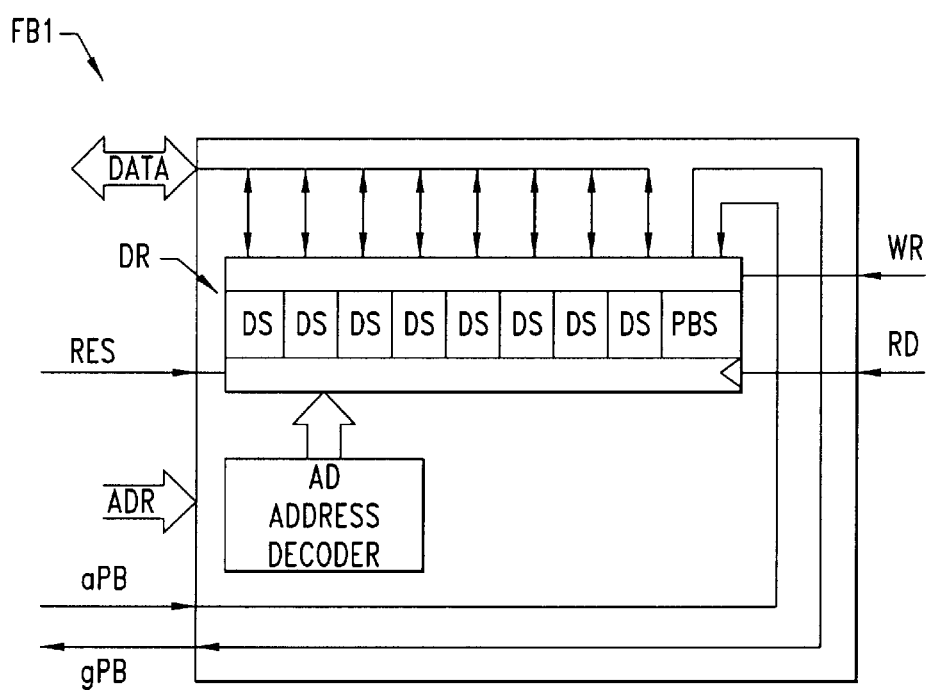
FIG. 10 shows a slave means of the circuit arrangement depicted in FIG. 1.

An embodiment of a function clock, e.g., FB1, shown in FIG. 10 comprises a data field register DR and an address decoder AD. Data field register DR comprises a number of data field register stages DS corresponding to the data field width of the respective function block, and furthermore a test bit memory stage PBS. Address decoder AD is connected to address bus ADR and releases the data field register DR for a write or read operation when it has been recognized with the aid of address decoder AD that the address of its function clock has been sent via address bus ADR. Under the control of system clock CLK, a data bit sequence can then be written from data bus DATA in parallel to the data field register stages DS or can be read from the data field register stages DS into data bus DATA, depending on whether a write or a read control command has reached data field register DR via the write and read control lines WR and RD.

In addition thereto, a current test bit aPB can be written by test bit generator B5 to the test bit memory location PBS of the addressed function block, and a previously stored test bit gPB can be read from the test bit memory location PBS and delivered to the test bit generator B5.

Via a resetting terminal RES, data field register DR can be reset to a predetermined initial state upon termination of a read operation, preferably during the time slot of the discard bit.

After having elucidated the structure and function of the individual circuits part, the overall mode of operation of the embodiment of a circuit arrangement according to the invention, as shown in FIG. 2, shall now be considered in addition.

It shall be assumed first that the microcontroller is supposed to write a data bit sequence in functional block FB1. To this end, the microcontroller delivers to serial input Sin a bit sequence comprising address field, control field and data field, which is passed both to the process control means B1 and to the multiplexer B2. By way of the address code contained in the address field, bit counter BZ, which is programmable in address-dependent manner, is matched to the entire bit sequence. With the aid of the control data resulting therefrom, bit sequence counter BD can gather from the control field of the bit sequence sent from the microcontroller the control bit representing either a write or a control command. The bit sequence coming from the microcontroller is written at the same time in the register stages FF of interface register B4, via the switch stages B8 of the multiplexer. This takes place under the control of demultiplexer DMX, such that only the bits of the address field and of the data field of this bit sequence are written in the interface register, but not the bit of the control field. Virtually at the same time as the bit-by-bit writing in the individual register stages of interface register B4 is carried out, reading back of the memory contents thereof takes place bit by bit, via switching means B7, to serial output Sout of multiplexer B2 leading to the microcontroller. With the aid of switching means B7, a control bit is introduced again in the bit sequence read back to the microcontroller, during the time slot of the control field of the bit sequence coming from the microcontroller. Reading out of the memory contents of interface register B4, with respect to the data field bit, takes place via switching unit B3, such that the data bits read from interface register B4 are fed both to multiplexer B2 and from there, together with the address bits and the control bit introduced by means of switching means 7, back to the microcontroller, and with respect to the mere data field, are fed to test bit generator B5 and to function blocks FB1 and FB2. As the write control bit provided between address field and data field, prior to reading out of the data field from interface register B4, has been singled out by means of bit sequence decoder BD, the command as to whether a write or a read operation is to be carried out is available at the beginning of the transfer of the data field from interface register B4 to the addressed function block FB1 or FB2, respectively. As the address bits are always written and are not subject to the write command, it is sufficient to arrange the control bit only after the address bits.

When the microcontroller sends as control bit a write command, the latter is stored as long as data are written in the interface register. The control bit constituting a write command thus is available at the time slot of the discard bit in order to permit or prevent transfer of the data bits written in interface register B4 to the addressed function block FB1 or FB2.

Along with reading-in of the data bit sequence delivered from interface register B4 in the data field register DR of the addressed function block, there takes place reading-in of the current test bit aPB belonging to this data bit sequence in the test bit memory location PBS of the addressed function block.

It shall be assumed now that the memory contents of a function block are to be transferred to the microcontroller. To this end, microcontroller again sends a serial bit sequence via serial input Sin to the process control means B1 and the multiplexer B2. The read control signal contained in the control bit field is read out with the aid of the bit sequence detector BD and is ready for read control of function blocks FB1 and FB72. In the event of such a read command, the frame end signal can be issued immediately after the control field of the bit sequence delivered from the microcontroller. As a consequence of the read command, the memory contents are read out from data field register DR of the addressed function block and, via data bus DATA, are supplied both to test bit generator B5 and to switching unit B3. Via the serial output Sout of multiplexer B2, a bit sequence now is transferred to the microcontroller which at first comprises the address bit sequence read out again from interface register B4, the status signal Q/N introduced in the control field with the aid of switching means B7, and the data bit sequence passed by means of switching unit B3 from the addressed function block to multiplexer B2. With the aid of test bit generator B5, a current test bit aPB has been produced for the data bit sequence delivered from the function block, and has been compared to the test bit gPB stored previously in the addressed function block. The microcontroller is thus notified via the status signal Q/N whether or not the data contents of the just read-out function block have been changed since the preceding addressing thereof.

What is claimed is:

1. A method of digitally transferring bit sequences of predetermined frame length in selective manner between a master means and one of several selectively controllable slave means via a serial interface which is disposed therebetween and capable of storing bit sequences and which is connected to a bus system establishing a connection to the slave means;

comprising:

a) generating bit sequences of predetermined maximum frame length, comprising: an address field having a predetermined address bit number for addressing the respective slave means to be controlled, a control field having a predetermined control bit number and containing control information, and a data field having a maximum data bit number;

b) sending the bit sequences in serial manner from the master means and writing the bit sequences in clock and bitwise manner in succession to the serial interface and storing the same as memory contents;

c) reading back the memory contents of the serial interface in clock- and bitwise manner in succession to the master means;

d) and, during one and the same clock, writing each bit of the serial bits received, which belongs to the respective clock, to the serial interface, and reading back the memory contents resulting therefrom from the serial interface to the master means; and e) sending a blocking signal from the master means preventing the transfer of bits from the serial interface to the respective addressed slave means when the read-back of any of the bit locations is not in conformity with the bit sent from the master means for this bit location.

2. The method of claim 1,
wherein the data field length of the respective addressed slave means is determined from the address associated therewith.

3. The method of claim 2,
wherein the addresses associated with the individual slave means are stored in a predetermined sequence in an address register of the master means, and the data field length of the respective addressed slave means is determined from the storage location of the address register in which the respective address is stored.

4. The method of claim 1,
wherein the control field of the bit sequence is employed for a write/read control signal.

5. The method of claim 1,
wherein the control field of the bit sequence is employed for a status signal.

6. The method of claim 5,
wherein the control field occupies only one bit locations of the bit sequence, and the control field of the bit sequence sent from the master means is used for transferring a write/read signal and the control field of the bit sequence sent to the master means is used for transferring the status signal.

7. The method of claim 5, for a circuit arrangement the slave means of which each have a data field register for storing data, the status signal being used for indicating whether or not the data contents of the data field register of the respective addressed slave means have changed, and wherein the status signal is generated by comparison of the respective current data contents with the respective preceding data contents of the data field register of the respective addressed slave means, or by comparison of a current test bit obtained from the current data contents with a test bit obtained from the preceding data contents.

8. The method of claim 7,
wherein, for generating the status signal during each write operation in the data field register and/or each read operation from the data field register of the respective addressed slave means, a test bit is generated and a status signal indicating a change in memory contents is generated when a current test bit differs from the respective preceding test bit.

9. The method of claim 1,
wherein a write or read control signal is sent from the master means at least to the respective addressed slave means and, in the event that the data transfer from the serial interface to the respective addressed slave means is to be prevented, a non-write control signal is sent as blocking signal to the addressed slave means.

10. The method of claim 1,
wherein there is provided for at least part of the slave means that the respective addressed slave means, at the end of reading out of its data contents to the master means, is reset to a predetermined initial state by the master means.

11. The method of claim 1,
wherein a microcontroller is used as master means and function means, such as controllers, sensors and status control means, are used as slave means.

12. A circuit arrangement, comprising a master means; a plurality of slave means; and a serial interface means provided therebetween, for digitally transferring bit sequences in selective manner between the master means and a respective selected slave means,
the bit sequences each having a predetermined maximum frame length and comprising at least one address field having a predetermined address bit number for addressing the respective slave means to be controlled, a control field having a predetermined control bit number and containing control information, and a data field having a maximum data bit number;

a clocked interface register which has a number of register stages corresponding at least to the sum of the address bit number and data bit number and being accessible in parallel as regards write and read access and each serving to store one bit, and which is adapted to be connected to a bus system establishing a connection to the slave means;

a conversion means through which bit sequences received in serial manner from the master means can be transferred in clock- and bitwise manner in succession to the individual register stages for writing them to the interface register, and through which the memory contents of the individual register stages, for reading back the memory contents of the interface register to the master means and/or for transferring the memory contents of the interface register to the slave means, can be read out in clock- and bitwise manner in succession from the individual register stages and can be sent in serial manner to the master means and/or to the slave means;

wherein during one and the same clock, the bit of the serial bits received, which belongs to the respective clock, can be written to the respective associated register stage, and the memory contents of this register stage resulting therefrom can be read back to the master means; and further wherein a blocking signal preventing the data transfer from the interface means to the respective addressed slave means can be sent from the master means when the read-back memory contents of any of the register stages are not in conformity with the bit sent from the master means for this register stage.

13. The circuit arrangement of claim 12,
wherein the master means comprises a microcontroller, and the slave means comprise function means.

14. The circuit arrangement of claim 12,
wherein the conversion means comprises a serial input for serial reception from the master means, a serial output for serial transmission to the master means, and a number of pairs of parallel parallel-data outputs and parallel parallel-data inputs, said number corresponding to the bit number at least of the address field and the data field;

wherein the register stages of the interface register each having a clock input, a bit input and a bit output;

and further wherein the bit inputs and the bit outputs of the register stages being connected to one each of the parallel-data outputs and parallel-data inputs of the conversion means, respectively.

15. The circuit arrangement of claim 12,
wherein the conversion means comprises a multiplexer and a process control means controlling the same.

16. The circuit arrangement of claim 15, wherein
the bit sequences written in the slave means and the bit sequences read from the slave means contain only the address field and the data field of the respective bit sequence transmitted and received from the master means, respectively;

a predetermined data bit number is associated with each slave means, which is gatherable from the respective associated address;

and the process control means comprises:

a bit counter which is programmable in address-dependent manner and which, while fed with the address field bits of the respective bit sequence to be transferred, generates a process control signal from which the control field position within the bit sequence is determined for the respective bit sequence to be transmitted, and a bit sequence decoder which can receive the process control signal and a serial bit sequence transmitted from the master means, and can take out from such a bit sequence at least one control bit and, during transfer of a bit sequence from one of the slave means to the master means, can introduce at least one control bit at the control field position into the bit sequence received from the slave means.

17. The circuit arrangement according to claim 16, wherein the bit sequence decoder comprises:

a control signal output for outputting a control signal corresponding to the taken out control bit, and a control signal input for taking over an information signal corresponding to the control bit to be introduced.

18. The circuit arrangement according to claim 17, wherein the control signal corresponding to the taken out control bit is a write or read signal by means of which it can be determined whether the respective addressed slave means is to be subject to a write or a read operation.

19. The circuit arrangement of claim 17, wherein the information signal corresponding to the control bit to be introduced is a status signal by means of which status information with respect to the respective addressed slave means can be supplied to the master means.

20. The circuit arrangement of claim 19, wherein the status signal contains information as to whether or not the data contents of the respective addressed slave means have changed since the last write and/or read operation.

21. The circuit arrangement of claim 15, wherein the multiplexer comprises:

an input constituting the serial input of the conversion means;

and output constituting the serial output of the conversion means;

a switch stage series having a number of switch stages corresponding to the number of register stages of the interface register, said switch stages each having one of the parallel inputs and one of the parallel outputs of the conversion means as well as a switching control input, the parallel inputs being all connected to the serial input and the parallel outputs being all connected to the serial output;

a switching means which, in accordance with a switching control signal supplied thereto, can pass a bit sequence read out from the interface register either to the master means or to the slave means;

and a demultiplexer which, in accordance with the process control signal received from the process control means, on the one hand can control the individual switch stages in succession for writing in and reading out, respectively, the respective associated register stage of the interface register, and on the other hand can generate the switching control signal.

22. The circuit arrangement of claim 21, wherein the switching means comprises a control bit input connected to the process control means and is controllable via the process control signal such that, upon reading back of the bit sequence written in the interface register to the master means, it connects the control bit input through to the serial output of the multiplexer during that period of time in which the master means expects the control field within the respective bit sequence.

23. The circuit arrangement of claim 21, wherein the switch stages of the multiplexer are controllable such that the switch stage selected from the demultiplexer for a respective write and/or read operation of the associated register stage establishes a connection between the parallel input and the bit input and between the bit output and the parallel output, respectively, of the switch stage/register stage pair concerned and, for each one of the remaining switch stage/register stage pairs, establishes a connection between the bit output and the bit input of the respective associated register stage.

24. The circuit arrangement of claim 12, wherein, between the conversion means, the interface register and the slave means, there is connected a switching unit that is controllable by means of a write/read control command and, upon receipt of a write control command, can pass the bit sequence stored in the interface register both to the conversion means and to the slave means and, upon receipt of a read control signal, can pass the bit sequence read out from the respective addressed slave means to the conversion means.

25. The circuit arrangement of claim 24, wherein the bit sequences transferred between switching unit and slave means can be fed to a test bit generator by means of which a current test bit can be produced from the bit pattern of the respective bit sequence, which can be compared, by means of a test bit comparison means, with a test bit previously produced for the same slave means, with a comparison result bit resulting from the comparison being adapted to be introduced, as a control bit, into the bit sequence to be fed to the master means.

26. The circuit arrangement of claim 25, wherein the test bit generator has series-connected XOR elements, the number of which is by one less than the maximum data bit number of the data field and which each have two XOR inputs and one XOR output, the two XOR inputs of a first XOR element being adapted to be fed with the first and second bit, respectively, of the bit sequence to be tested, and the two XOR inputs of the additional XOR elements being adapted to be fed with one further bit each of the bit sequence to be tested and, respectively, with the output signal of the respective preceding XOR element, and the test bit being available at the XOR output of the last XOR element.

27. The circuit arrangement of claim 26, wherein the last XOR element is followed by an additional XOR element which constitutes the test bit comparison means and also has two XOR inputs and one XOR output, a first one of the two XOR inputs of the additional XOR element being adapted to have applied thereto the respective test bit produced, and the second XOR input of the additional XOR element being adapted to have applied thereto the respective previously produced test bit, and a test bit comparison signal usable as change indication signal, in particular as status signal, being available at the XOR output of the additional XOR element.

28. The circuit arrangement of claim 25,
in which the respective test bit produced can be written to a test bit register and, for comparison with a test bit produced subsequently, can be supplied to the second XOR input of the additional XOR element.

29. The circuit arrangement of claim 12,
wherein at least part of the slave means comprises a data field register and an address decoder each, which upon receipt of the address bit sequence intended for the respective slave means releases the data field register for writing or reading.

30. The circuit arrangement of claim 29,
wherein the data field register comprises data field register stages in a number that is by one higher than the data bit number predetermined for the respective slave means, one of the data field register stages being usable as test bit register.

31. The circuit arrangement of claim 29,
wherein the data field register comprises a resetting input via which the memory contents of the data field register, after a read-out operation, can be set back to a predetermined initial stage.

32. A method for serial transfer of bit sequences, comprising:
sending a bit sequence in a serial manner from a master means to a serial interface;
reading back each bit of the bit sequence from the serial interface to the master means;
comparing each read-back bit with each bit sent to the serial interface; and
preventing bit sequence transfer from the serial interface to a slave means when the read back of any bit from the serial interface is not in conformity with the bit sequence sent from the master means.

33. The method of claim 32 wherein comparing each read-back bit further comprises sending a discard bit signal to the serial interface at the end of the comparing to initiate preventing bit sequence transfer.

34. The method of claim 32, further comprising sending a read/write control signal from the master means to the slave means.

35. The method of claim 34 wherein the bit sequence comprises an address bit sequence, a data bit sequence, and a control signal, and wherein sending the bit signal further comprises receiving and storing the address bit sequence and the data bit sequence in the serial interface and receiving and storing the control signal in the slave means.

36. The method of claim 34, further comprising receiving a read signal at the slave means and reading a bit sequence to the master means comprising a current data bit sequence and a status signal from the slave means, and an address bit sequence from the serial interface.

37. The method of claim 36, further comprising generating the status bit signal from a comparison of the current data bit sequence stored in the slave means with a preceding data bit sequence stored in the slave means.

38. The method of claim 32 wherein the address bit sequence includes a data field length signal, and wherein sending the bit sequence from the master means further comprises sending a frame end signal in accordance with the data field length signal in the address bit sequence.

39. A circuit for serial transfer of bit sequences, comprising:

a master controller configured to send a bit sequence in a serial manner;
a plurality of slave circuits configured to receive and send a bit sequence in a serial manner; and
a serial interface coupled between the master controller and the plurality of slave circuits, the serial interface configured to receive the bit sequences from the master controller;
the master controller configured to read back the bit sequence from the serial interface and compare the read-back sequence with the bit sequence transmitted to the serial interface and to prevent sending of the bit sequence from the serial interface to the slave circuits when the read-back sequence is not in conformity with the bit sequence sent from the master controller.

40. The circuit of claim 39 wherein the master controller is configured to send a discard signal to the serial interface to prevent sending of the bit sequence to the slave circuits.

41. The circuit of claim 39 wherein the master controller is further configured to send a read/write signal to the slave circuits, and the slave circuits are configured to send a status signal to the master controller when data stored in the slave circuits has changed.

42. The circuit of claim 39, further comprising a converter coupled between the master controller and the serial interface and configured to receive the bit sequence from the master controller in a serial manner and to convert the bit sequence for transferring in a clock-and-bitwise manner to the serial interface, to the slave circuits, and for read back to the master controller.

43. The circuit of claim 42 wherein the converter comprises a multiplexer and a process controller for controlling the multiplexer.

44. The circuit of claim 43 wherein the bit sequence written to and read from the slave circuits contains only an address field and a data field from the respective bit sequence transmitted and received from the master controller, respectively, and the address field further includes a predetermined data bit number associated with each slave circuit that is detectable from the address field associated with each slave circuit; and
the process controller comprising a bit counter programmable in address-dependent manner and, upon receipt of the address field bits of the respective bit sequence to be transferred, generates a process control signal from which a control field position within the bit sequence is detectable for the respective bit sequence to be transmitted; and
a bit sequence decoder configured to receive the process control signal and the bit sequence transmitted from the master controller, and to remove the control field bit from the bit sequence, and, during transfer of a bit sequence from a slave circuit to the master controller, to introduce at least one control bit in the control field position into the bit sequence received from the slave circuit.

45. The circuit of claim 43 wherein the multiplexer comprises:
an input configured to receive the bit sequence from the master controller;
an output for sending a converted bit sequence;
a switch stage series having a plurality of switch stages, each of the switch stages having one of a plurality of parallel inputs and one of a plurality of parallel outputs, and a switching control input, the parallel inputs being all connected to the multiplexer input, and the parallel outputs being all connected to the multiplexer output;

a switching means that, in accordance with a switching control signal supplied thereto, is configured to pass a bit sequence read out from the serial interface to either of the master controller and the slave circuits; and a demultiplexer that is configured to receive a process control signal from the process controller to control the switch stages in succession for writing in and reading out, respectively, a respective associated register stage in the serial interface and to generate a switching control signal.

46. The circuit of claim 45, further comprising a test bit generator configured to receive the bit sequence transferred between the switching unit and the slave circuit and to generate a test bit from the bit pattern of the respective bit sequence; and further comprising a test bit comparator configured to compare a current test bit from the test bit generator with a previous test bit produced for the same slave circuit and generating a comparison result bit for use as a control bit in the bit sequence to be sent to the master controller.

47. The circuit of claim 43 wherein a switching unit is coupled to the converter, the serial interface, and the slave circuits, the switching unit configured to be controlled by the read/write signal from the master controller, upon receipt of a write control command, to pass the bit sequence stored in the serial interface to both the converter and the slave circuits, and, upon receipt of a read control signal, to pass the bit sequence read out from the respective addressed slave circuit to the converter.

* * * * *